United States Patent [19]

Soares

[11] Patent Number: 4,700,595

[45] Date of Patent: Oct. 20, 1987

[54] BALANCE MECHANISM FOR MOVABLE JAW CHUCK OF A SPIN STATION

[75] Inventor: Paul Soares, Belmont, Calif.

[73] Assignee: Silicon Valley Group, Inc., San Jose, Calif.

[21] Appl. No.: 864,078

[22] Filed: May 16, 1986

[51] Int. Cl.⁴ .............................................. B23B 31/14
[52] U.S. Cl. .................................... 82/40 R; 279/1 C
[58] Field of Search ................... 82/40 R, 45, DIG. 6, 82/DIG. 8; 279/1 C, 1 L, 1 J; 51/237 R; 74/573 R

[56] References Cited

U.S. PATENT DOCUMENTS

| 2,471,038 | 5/1949 | Luginbuhl | 279/1 C |
|---|---|---|---|
| 2,729,459 | 1/1956 | Leifer | 279/1 C |
| 2,861,471 | 11/1958 | Kronenberg | 82/DIG. 8 |
| 2,982,558 | 5/1961 | Multer | 279/1 C |

FOREIGN PATENT DOCUMENTS

| 481505 | 12/1916 | France | 279/1 C |
|---|---|---|---|
| 2248901 | 5/1975 | France | 279/1 C |
| 458397 | 3/1975 | U.S.S.R. | 279/1 C |
| 688295 | 9/1979 | U.S.S.R. | 279/1 C |
| 776775 | 11/1980 | U.S.S.R. | 279/1 C |

Primary Examiner—M. Jordan
Assistant Examiner—Jerry Kearns
Attorney, Agent, or Firm—Donald C. Feix

[57] ABSTRACT

A wafer processing spin station includes a movable jaw chuck which is adjustable in position at the clamping position to accommodate offset of the center of the wafer with respect to the axis of rotation. A balancing apparatus and method are used with the movable jaw chuck to maintain the gripping force exerted on the wafer by the movable jaw chuck substantially unaffected by the centrifugal forces developed by the movable jaw chuck at all speeds of rotation produced during the spinning operation and within the range of the clamping positions of the movable jaw chuck.

11 Claims, 9 Drawing Figures

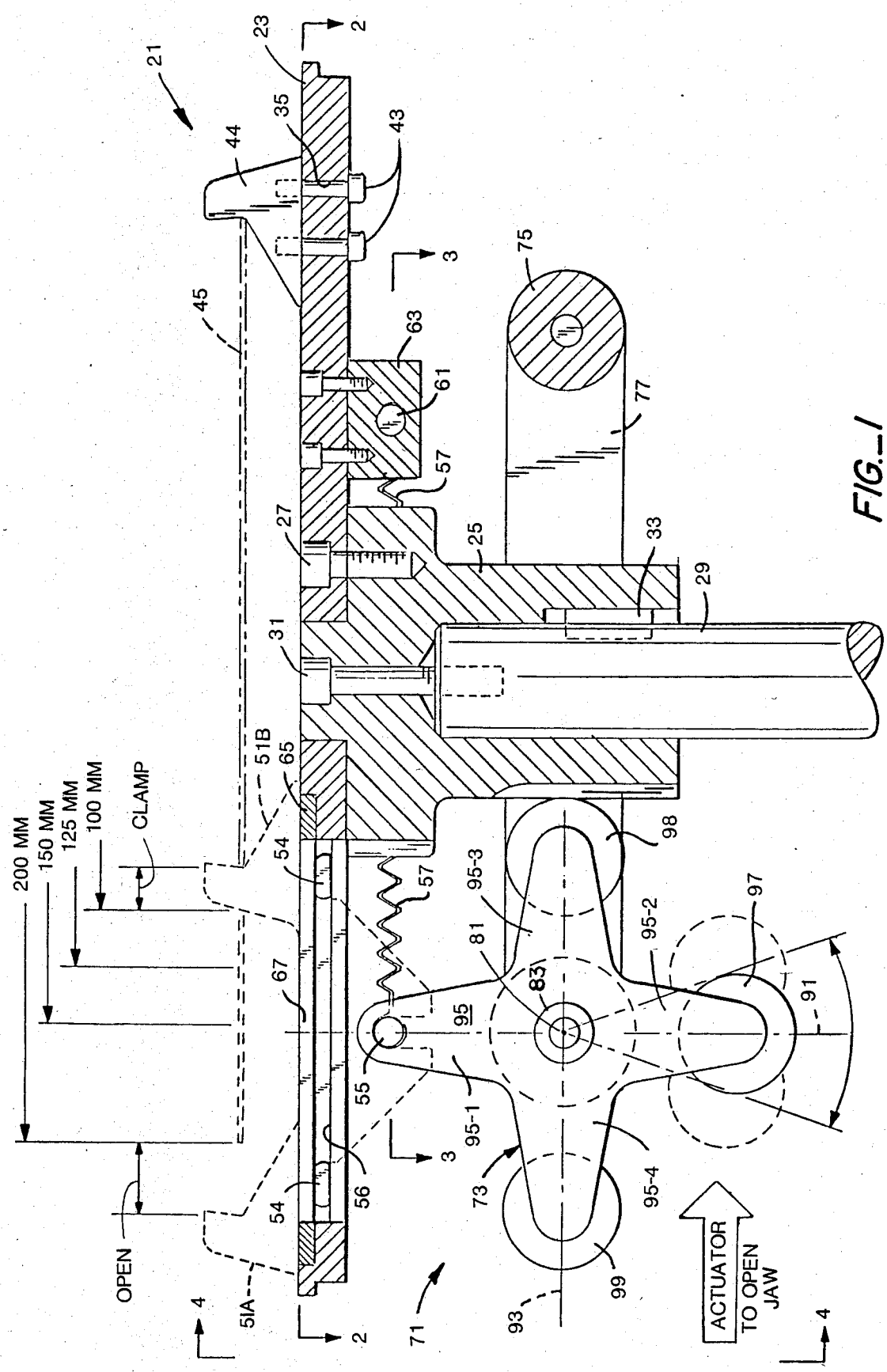
FIG._1

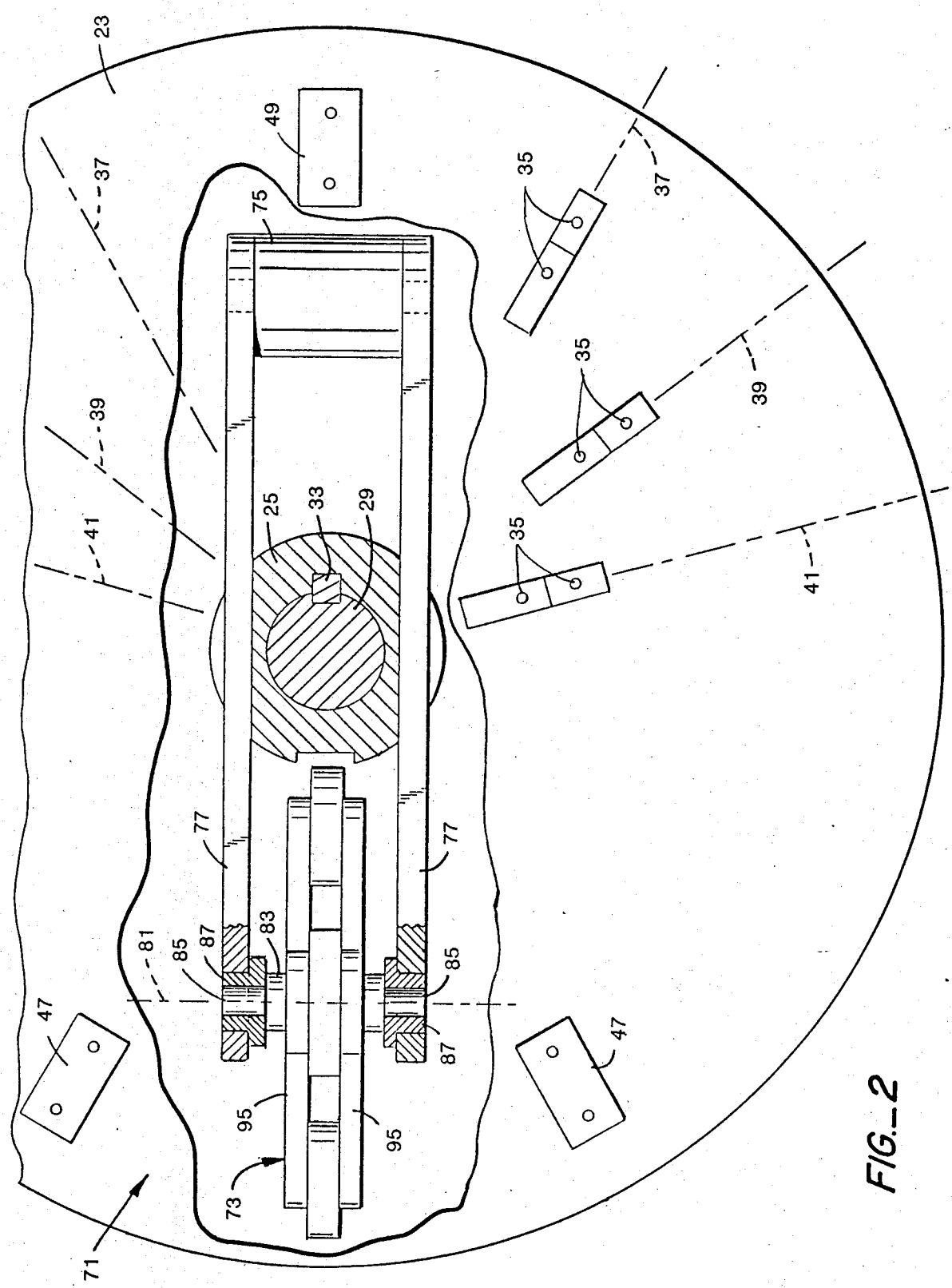
FIG._2

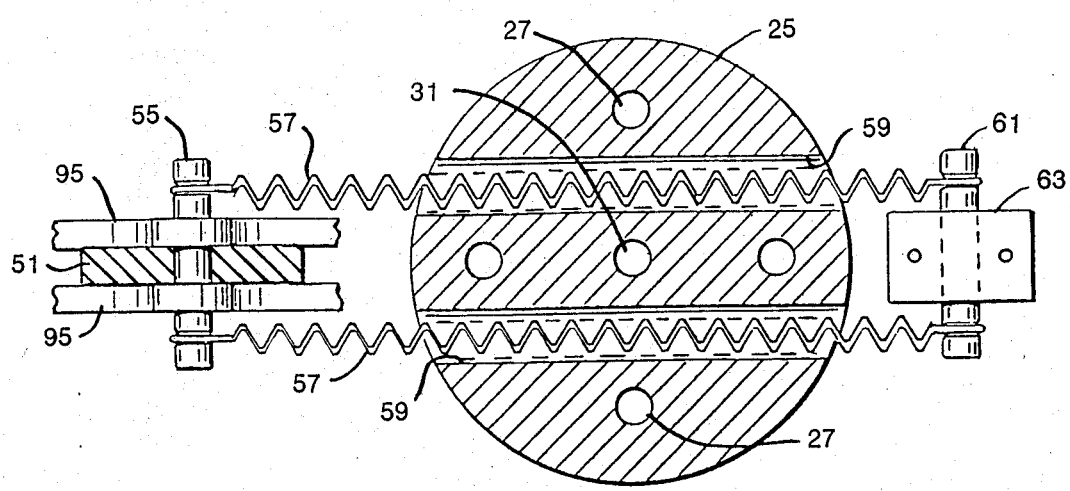
FIG._3
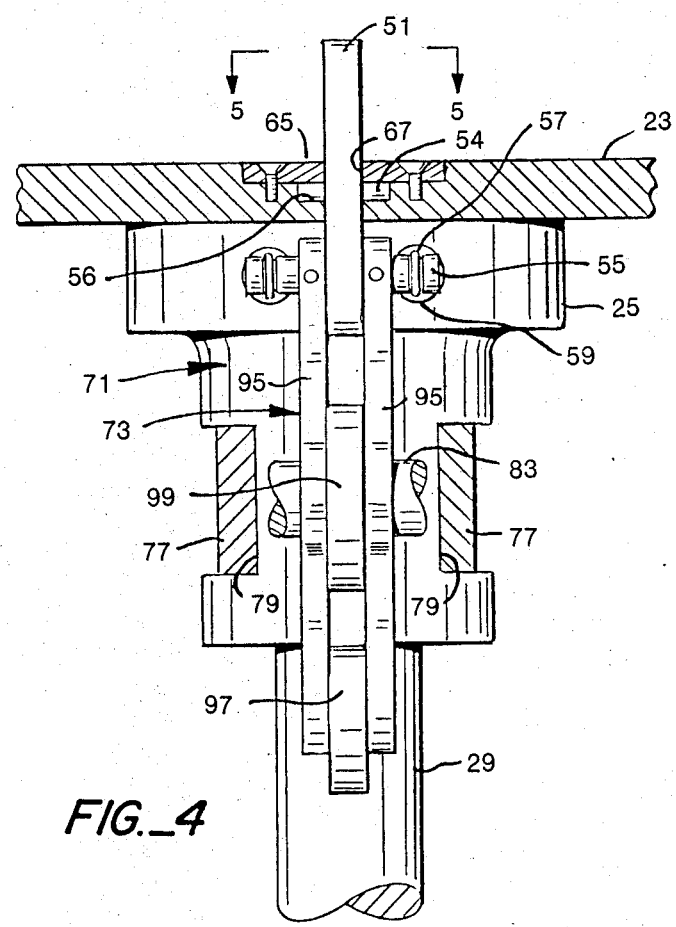
FIG._4
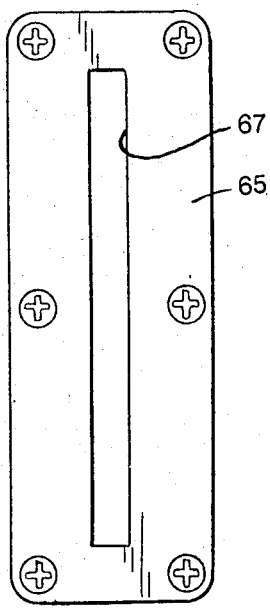
FIG._5

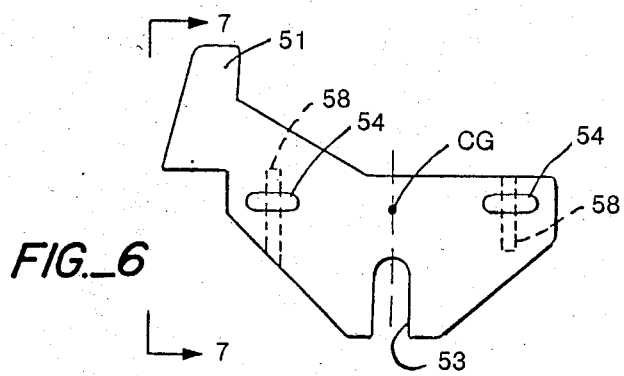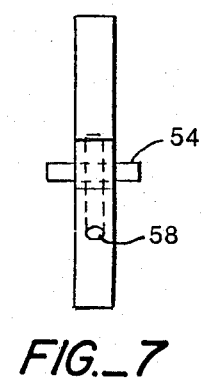

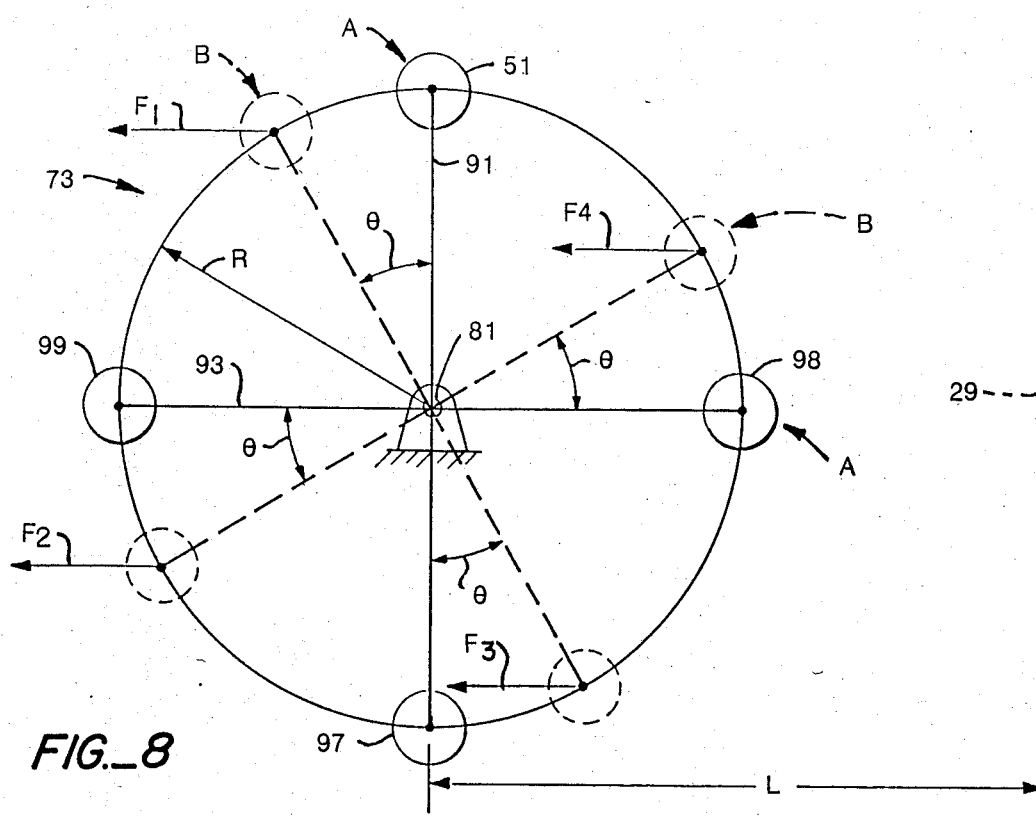
FIG._8
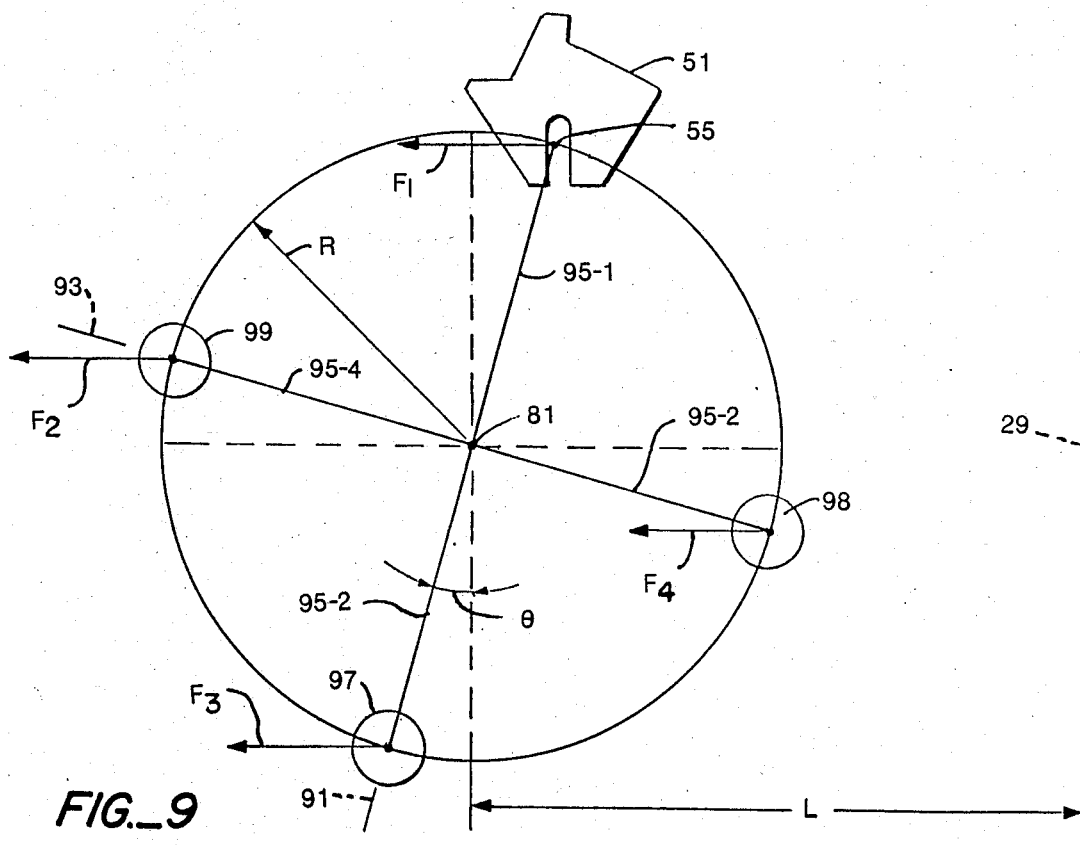
FIG._9

BALANCE MECHANISM FOR MOVABLE JAW CHUCK OF A SPIN STATION

BACKGROUND OF THE INVENTION

This invention relates to a wafer processing spin station of the kind in which a wafer is gripped between jaws and is rotated to relatively high speeds of rotation in the course of performing a spinning operation at the spin station.

This invention relates particularly to a wafer processing spin station which has a movable jaw chuck and a balancing mechanism which is effective to maintain the gripping force exerted on the wafer by the movable jaw chuck substantially unaffected by the centrifugal forces developed by the movable jaw chuck during this spinning operation.

Wafers are manufactured with a variety of nominal diameters, such as, for example, 100 millimeters, 125 millimeters, 150 millimeters and 200 millimeters; and each diameter size may have one flat or more than one flat. The angles at which the flats are oriented about the periphery of the wafer also varies.

In order, therefore, for a single machine to be able to perform spinning operations on wafers of more than a single diameter and wafers having other than a fixed number and orientation of flats, the machine must have a jaw arrangement which can accommodate the varied edge configurations of the wafers.

One, or more, of the gripping jaws must be movable to permit the jaws to be moved between an open position for loading and unloading and a closed, clamping position for spinning. A movable jaw must be movable to accommodate the extra travel required when the jaw engages a flat rather than a circular edge of the wafer. A movable jaw must also be able to accommodate a variable amount of offset of the center of a wafer with respect to the axis of rotation of the spin station.

A movable jaw must, as a practical matter, therefore be somewhat adjustable in its final clamping position in order to accommodate varying orientations of flats and varying amounts of offset of individual wafers with respect to the clamping jaws and the axis of rotation.

This variation in final position of a movable jaw element in the clamping position can present problems of balancing the centrifugal force which is developed within the movable jaw element during the rotation required for the spinning operation.

If the centrifugal force is not counterbalanced sufficiently, the movable jaw can move outwardly and release the clamping force on the wafer. This can permit the wafer to fly out of the spin station and to be destroyed.

If the centrifugal force developed by the movable jaw is overbalanced, the movable jaw can be forced inwardly, and the wafer can be crushed.

It is a relatively simple matter to exactly balance the centrifugal force of a movable jaw for any given, exactly known position of the movable jaw. However, because of the practical problem of varying orientations of flats with respect to the jaws and of variation between the amounts of offset of the center of the wafer with respect to the axis of rotation, the final, clamping position of the movable jaw for any particular wafer can't be exactly known. Instead, the clamping position of the movable jaw must be adjustable to accommodate the variation in the amount of travel required from wafer to wafer, and this presents a problem of counterbalancing the centrifugal force developed in the movable jaw in a way that does not let the movable jaw slide out and release the wafer or in a way that does not overcompensate and cause the movable jaw to move inwardly and crush the wafer.

SUMMARY OF THE INVENTION

It is a primary object of the present invention to overcome the balance problems of prior spin stations having a movable jaw chuck.

It is a specific object of the present invention to balance a movable jaw chuck in a way which is effective to maintain the gripping force exerted on the wafer by the movable jaw chuck substantially unaffected by the centrifugal forces developed by the movable jaw chuck at all speeds of rotation produced during the spinning operation and within the range of clamping positions of the movable jaw chuck.

A wafer processing spin station constructed in accordance with one embodiment of the present invention comprises a jaw mounting plate and a spindle connected to rotate the jaw mounting plate.

Wafer gripping jaws are operatively associated with the jaw mounting plate for gripping the wafer on its outside edge to hold the wafer in place between the jaws during a spinning operation.

The jaw gripping means include at least one movable jaw chuck which is movable between an open position and a clamping position and which is also adjustable in position at the clamping position to accommodate the varying amount of travel required for varying orientations of flats and varying amounts of center offset of individual wafers.

In accordance with the present invention, a balancing mechanism is operatively associated with the movable jaw chuck and is effective to maintain the gripping force exerted on the wafer by the movable jaw chuck substantially unaffected by the centrifugal forces developed by the movable jaw chuck at all speeds of rotation produced during the spinning operation and within the range of clamping positions of the movable jaw chuck.

The balancing mechanism is mounted for pivoting movement about a pivot axis and is incorporated in a body of rotation formed about the pivot axis. The balance mechanism includes weights distributed within the body of rotation so as to produce no net rotative movement about the pivot axis regardless of angular rotation of the balance mechanism about the pivot axis. The center line of the spindle lies in the plane perpendicular to the pivot axis of the balance mechanism and passing through the balance mechanism.

In one specific embodiment of the present invention the balance mechanism has a star configuration as viewed in side elevation, and the movable jaw appears to the system balance mechanism as a point on one tip of the star.

In other embodiments the balance mechanism may have more than one star configuration of balance weights and may in fact approach the configuration of a continuous disk.

Wafer processing spin station apparatus and methods which incorporate the features described above and which are effective to function as described above constitute further, specific objects of the present invention.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a side elevation view, partly in cross section to show details of construction, of a wafer processing spin station having a movable jaw chuck and balancing mechanism constructed in accordance with one embodiment of the present invention.

FIG. 2 is a fragmentary plan view which is partly broken away to show details of construction. FIG. 2 shows locations for fixed jaws used to grip wafers varying in diameter from 100 millimeters to 200 millimeters.

FIG. 3 is a fragmentary plan view, taken generally along the line and in the direction indicated by the arrows 3—3 in FIG. 1. FIG. 3 shows details of the spring mechanism for developing the gripping force exerted on the wafer by the movable jaw chuck.

FIG. 4 is a fragmentary side elevation view, partly in cross section to show details of construction, and taken generally along the line and in the direction indicated by the arrows 4—4 in FIG. 1.

FIG. 5 is a top plan view of a window plate associated with the movable jaw chuck of the embodiment shown in FIG. 1. FIG. 5 is taken generally along the line and in the direction indicated by the arrows 5—5 in FIG. 4.

FIG. 6 is a side elevation view of a movable jaw chuck used with the balancing mechanism shown in FIG. 1. FIG. 6 shows a movable jaw chuck used for a 200 millimeter diameter wafer.

FIG. 7 is an end elevation view of the movable jaw chuck shown in FIG. 6 and is taken along the line and in the direction indicated by the arrows 7—7 in FIG. 6.

FIG. 8 is a diagramatic view illustrating how radial and identical symmetry about two orthogonal diameters results in keeping the balancing mechanism of the FIG. 1 embodiment in balance for any position of the movable jaw chuck within the range of movement of the movable jaw chuck. The clockwise moments produced by the balancing mechanism are equal to the counter clockwise moments so that the entire system is always in balance at all distances of the movable jaw chuck from the axis of rotation of the spindle and at all speeds of rotation of the spindle mechanism.

FIG. 9 is a diagramatic view like FIG. 8 but showing the movable jaw chuck moved to a clamping position from an initial, open position.

DETAILED DESCRIPTION OF THE PREFERRED EMBODIMENTS

A wafer processing spin station having a balancing mechanism constructed in accordance with one embodiment of the present invention is indicated generally by the reference numeral 21 in FIGS. 1 and 2.

The spin station 21 has a jaw mounting plate 23. The plate 23 is attached to a spindle mount hub 25 by cap screws 27, and the hub 25 is attached to a spindle 29 by a cap screw 31 and a key 33 so that the plate 23 is rotated by the spindle 29.

As illustrated in FIGS. 1 and 2 the plate 23 is drilled with openings 35 at certain locations along radial lines 37, 39 and 41 so that cap screws 43 can be used to mount pairs of fixed jaw chucks (like the fixed jaw chuck 44 shown in FIG. 1) on the top surface of the mounting plate 23.

In the specific embodiment shown in FIGS. 1 and 2, two fixed jaws and one movable jaw are used for gripping a wafer. A wafer 45 is shown in dashed outline in FIG. 1.

With continued reference to FIG. 2, the two fixed jaws for a 200 millimeter diameter wafer are mounted on the lines 37, the two fixed jaws for a 150 millimeter diameter wafer are mounted on the lines 39 and the two fixed jaws for a 100 millimeter diameter wafer are mounted on the lines 41 in FIG. 2.

In another embodiment four fixed jaws are used on lines 37 and 41 and no jaws are used on line 39. With this embodiment, as wafers are changed from 200 mm down to 150, 125 and 100 mm, the fixed jaws are moved radially inwardly along the lines 37 and 41.

As also illustrated in FIG. 2, two fixed counterweights can be mounted under the plate 23 at the locations indicated by the numerals 47 for balancing the fixed jaws at the 200 millimeter position.

A trim counterweight may be mounted underneath the plate 3 at the location indicated by the numeral 49 in FIG. 2 for compensating for the fixed jaws at the 150, 125 and 100 millimeter wafer diameter fixed jaw positions.

In accordance with the present invention, the specific embodiment of the spin station 21 shown in the drawings incorporates a single, movable jaw chuck 51 which coacts with the two fixed jaws 44 to grip a wafer 45 on its outside edge and to hold the wafer in position between the fixed and movable jaws during a spinning operation.

The movable jaw 51 is movable between the two positions indicated by the phantom outlines 51A and 51B in FIG. 1. The position indicated by the phantom outline 51A is the open position for receiving a 200 millimeter diameter wafer, and the position indicated by the phantom outline 51B is the clamped position for gripping a 100 millimeter diameter wafer. The movable jaw 51 is movable to the respective clamping positions in FIG. 1.

As illustrated in FIGS. 6, 8 and 9, the configuration of the movable jaw chuck 51 may vary, depending upon the diameter of the wafer to be gripped.

Each movable jaw chuck 51 is formed with a lower slot 53 for receiving a pin 55.

The center of gravity CG for each movable jaw chuck 51 falls on the line of center extending through the slot 53 as illustrated in FIGS. 6, 8 and 9.

The jaw chuck 51 has front and rear slide elements 54 which engage a slot 56 in the plate 23 (see FIGS. 1 and 4). The slide elements are held in place by screws 58.

As best illustrated in FIGS. 3 and 4, each outer end of the pin 55 is connected to a spring 57. Each spring 57 extends through a related opening 59 in the hub 25, and the other end of each spring 57 is connected to a related end of a pin 61 which is held in position on the under side of plate 23 by a mounting block 63.

The springs 57 thus exert force on the movable jaw chuck 51 for pulling the movable jaw chuck 51 into engagement with the edge of the wafer 45 and for holding the wafer 45 gripped or clamped in position within the fixed jaws 44 and movable jaw 51 during a spinning operation.

As illustrated in FIGS. 4 and 5, a window plate 65 having a slot 67 for movement of the movable jaw chuck 51 is mounted in the top of the plate 23 above the slot 56.

The movable jaw chuck 51 is movable between the positions 51A and 51B as shown in FIG. 1 so that a single movable jaw can be used (with a related pair of fixed jaws 44) to grip a wafer in any one of the four diameters indicated by the legends in the top of FIG. 1.

When, for example, the spin station is set up for a 200 millimeter diameter wafer, two fixed jaws are located at the positions indicated on the lines 37 in FIG. 2, and all other fixed jaws are removed.

When the spin station is to be used with wafers of 100 millimeter diameter, the two fixed jaws are mounted at the positions indicated on the lines 41 in FIG. 2, and all other fixed jaws are removed.

The movable jaw 51 is thus movable between an open position and a clamping position for each size wafer.

There is, as noted above, a need for providing for some adjustment of the clamping position of the movable jaw for individual wafers. The number and orientation of flats on a wafer vary with wafer design. Some wafers (of any given diameter) might have a single flat. Other wafers of that diameter might have several flats. The number of flats and the orientation of the flats (as the wafer is transported to and located at the spin station) can cause variations in how the edge of the wafer is engaged by the jaws. When a movable jaw engages a flat, the travel of the jaw is greater than when the movable jaw engages a circular edge. It is also not possible, as a practical matter, to locate each individual wafer at the spin station in a way that provides exact alignment of the line of center of the wafer with the rotational axis of the spindle 29. Instead, there is usually some offset between the center of the wafer and the axis of rotation.

The movable jaw must therefore accommodate such variation in orientation of flats and such offset, because the fixed jaws cannot be moved.

The amount of travel required for the movable jaw to grip a particular wafer determines the final position at which the movable jaw 51 is located when the wafer is clamped within the jaws in the course of performing a spinning operation.

Because the movable jaw 51 is located radially outwardly from the axis of rotation of the spindle 29, the rotation of the spindle 29 causes a centrifugal force to be developed by the weight of the movable jaw chuck 51. This centrifugal force must be dynamically and exactly balanced at all speeds of rotation of the spin station 21 and at all positions of the movable jaw chuck 51 within the clamping range of positions of the movable jaw chuck in order to maintain the gripping force exerted on the wafer by the movable jaw chuck substantially unaffected by centrifugal forces by the movable jaw chuck.

The gripping force desired to be exerted on the wafer is just the force exerted by the springs 57.

If the centrifugal force developed by the movable jaw chuck 51 is not counterbalanced, the movable jaw chuck 51 will move outward. This releases the clamp on the wafer 45, permitting the wafer to fly out of the spin station and to be destroyed.

If the centrifugal force developed by the movable jaw chuck 51 is overbalanced, the movable jaw chuck will be forced inward, and the wafer 45 will be crushed.

It is a relatively simple matter to exactly balance the centrifugal force of the movable jaw chuck 51 for any given, exactly known position of the movable jaw chuck; but (as pointed out above) the final, clamping position of the movable jaw chuck 51 for any particular wafer of any particular nominal diameter can't be exactly known. Instead, the clamping position of the movable jaw chuck 51 must be adjustable to accommodate varying orientations of flats and varying amounts of center offset from wafer to wafer.

It is therefore an important feature of the present invention that centrifugal force developed by the weight of movable jaw chuck 51 is dynamically and exactly balanced at all speeds of rotation of the spin station 21 and at all positions of the movable jaw chuck within the clamping range of positions in order to maintain the gripping force exerted on the wafer by the movable jaw chuck substantially unaffected by the centrifugal forces developed by the movable jaw chuck.

This is accomplished in accordance with the present invention by a balancing mechanism which is indicated generally by the reference numeral 71 in FIGS. 1, 2 and 4 of the drawings.

The balancing mechanism 71 comprises a star assembly 73, a main counterweight 75 and two main bars 77 which mount the assembly 71 on the hub 25.

As illustrated in FIG. 4, the bars 77 fit in recesses 79 in the hub 25. The main counterweight 75 balances the star assembly 73 and the movable jaw 51.

The star assembly 73 provides the balance for the centrifugal force developed by the movable jaw 51.

As best illustrated in FIGS. 1 and 2, the star assembly 73 can rotate in a clockwise and in a counterclockwise direction about an axis 81 which extends at a right angle to the axis of rotation of the spindle 29. The star assembly 73 has a central shaft 83, and the shaft 83 has reduced diameter end members 85 which are mounted within bushings 87 in the left-hand ends (as viewed in FIGS. 1 and 2) of the main bars 77. These bushings permit the rocking or pivoting movement of the star assembly 73 in clockwise and counterclockwise directions.

As illustrated in FIG. 1, the star assembly 73 has a first axis 91 which extends through the center of the pivot pin 81 and the center of the pin 55.

The star assembly 73 has the second axis 93 which is orthogonal to the axis 91 and which also passes through the center of the pivot pin 81.

The star assembly 73 has two star shaped members 95 which are laterally spaced apart as illustrated. Each star shaped side member 95 has an upper leg 95-1, a lower leg 95-2, one side leg 95-3 and another side leg 95-4 (see FIG. 1).

A small counterweight 97 is mounted between the two legs 95-2. A small counterweight 98 is mounted between the two legs 95-3, and a small counterweight 99 is mounted between the two legs 95-4. The weight of each counterweight 97, 98 and 99 is exactly equal to the weight of the movable jaw chuck 51.

The center of gravity of each counterweight 97, 98 and 99 is located the exact distance from the pivot axis 81 as the distance of the center of the pin 55 from the pivot axis 81.

As noted above (and as illustrated in FIG. 6) the center of gravity of the movable jaw chuck 51 is exactly vertically aligned with the center of the pin 55.

As a result, the star assembly 73 has radial and identical symmetry about the two orthogonal diameters 91 and 93. The movable jaw 51 appears to this star system balance mechanism 73 as a point on one tip of the star. The movable jaw chuck 51 is, in effect, pinned to the tips of the legs of the 95-1 in the same way that the counterweights 97, 98 and 99 are connected to their respective legs.

The significance of this will be described in more detail below with reference to FIGS. 8 and 9.

With continued reference to FIG. 1, in the specific embodiment illustrated, it may be noted that the lower leg 95-2 may be rotated through an angle of about 39° to produce about 1" travel of the pin 55. For each particular movable jaw, the first $\frac{3}{8}$" of travel is from an open position to the zone of clamping that extends $\frac{3}{8}$", or a total of 1" maximum travel. This maximum travel of 1" is limited by the window 67.

The positions 51A and 51B illustrated in FIG. 1 are 3" apart and illustrate a total range of positions using 200 mm wafers down to 100 mm wafers.

The dynamic operation of the balance mechanism 71 will now be described with particular reference to FIGS. 8 and 9.

With particular reference to FIG. 8, if it is assumed that each of the weights 51, 97, 98 and 99 is a unit weight, it can be seen that rotation of the star assembly 73 from the A position of the weights to the B position of the weights about the pivot axis 81 does not change the end balance condition of the system, because the counterclockwise moments $F_1$ and $F_4$ produced by the centrifugal forces developed in the weights 51 and 98 exactly equal and balanced the counterclockwise moments $F_2$ and $F_3$.

The centrifugal forces are proportionate to the weight distances from the spindle centerline (axis of rotation). At position B the weight 51 exerts a higher centrifugal force than 97, tending to rotate the star assembly counterclockwise. On the other hand, the weight 99 exerts a larger force than the weight 98, trying to rotate the star assembly clockwise. It can be shown that these two moments counterclockwise and clockwise are equal for any angle, keeping the assembly always in balance.

FIG. 9 is a diagramatic view like FIG. 8 but showing the movable jaw 51 in pictorial form and showing this jaw 51 moved rightwardly (in a counterclockwise position as viewed in FIG. 9) in the process of being moved from the open position to to the clamping or wafer gripping position. In the balance mechanism as shown in FIG. 9 the system remains in balance for all positions of the movable chuck 51 (within the range of clamping positions required), because the counterclockwise moments balance the clockwise moments.

Slight variations in the final, clamping location of the movable jaw chuck 51 (resulting from physical variations of the edges of individual wafers or from the orientation of wafer flats in the jaws) therefore has no effect on the unbalanced centrifugal force developed by the movable jaw chuck 51; and the centrifugal force developed in the movable jaw chuck 51 therefore has no effect on the force with which the wafer is gripped by the movable jaw chuck 51.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A wafer processing spin station of the kind in which a wafer, which may have a number of flats, is gripped between jaws and is rotated to relatively high speeds of rotation about a spindle axis of rotation in the course of performing a spinning operation on the wafer at the spin station, said spin station comprising,
   a jaw mounting plate,
   a spindle connected to rotate the jaw mounting plate,
   jaw means operatively associated with the jaw mounting plate for gripping the wafer on its outside edge to hold the wafer in place between the jaw means during a spinning operation,
   said jaw means including at least one movable jaw chuck which is movable between an open positon and a clamping position and which is adjustable in position at the clamping position to accommodate gripping by the jaw means of wafers whose centers are offset from the spindle axis of rotation as a result of wafer tolerance diameter variations and/or differences in the number of wafer flats and/or variations of orientations of wafter flats with respect to the locations of the jaw means, and
   balancing means operatively associated with the movable jaw chuck and effective to maintain the gripping force exerted on the wafer by the movable jaw chuck substantially unaffected by the centrifugal forces developed by the movable jaw chuck at all speeds of rotation produced during the spinning operation and within the range of clamping positions of the movable jaw chuck.

2. The invention defined in claim 1 wherein the movable jaw chuck is movable through a workihg range sufficient to accomodate gripping of wafers having diameters from 100 millimeters to 200 millimeters.

3. The invention defined in claim 1 wherein the balancing means include a balance mechanism connected to the movable jaw chuck and mounted for pivoting movement about a pivot axis spaced from the spindle axis of rotation, and including means mounting the balance mechanism for rotation about said spindle axis of rotation, and wherein the balance mechanism is incorporated in a body of rotation formed about the pivot axis and includes balance weights distributed within the body of rotation so as to produce no net rotative forces about the pivot axis regardless of angular orientation of the balance mechanism about the pivot axis.

4. The invention defined in claim 3 wherein the axis of rotation of the spindle lies in a plane perpendicular to the pivot axis of the balance mechanism and passing through the balance mechanism.

5. The invention defined in claim 2 wherein the balance mechanism has a pin type connection to the movable jaw chuck with the center of the pin type connection located on a line extending parallel to the axis of rotation of the spindle and passing through the center of gravity of the movable jaw chuck.

6. The invention defined in claim 5 wherein the balance mechanism has a first balance weight having a weight equal to the weight of the movable jaw chuck and having a center of gravity located on a line which passes through both said pin type connection and said pivot axis and wherein the center of gravity of the first balance weight is located at a point which is laterally offset from the pivot axis by the same distance as the distance of the pin type connection from the pivot axis.

7. A wafer processing station of the kind in which a wafer, which may have number of flats, is gripped between jaws and is rotated to relatively high speeds of rotation about a spindle axis of rotation in the course of performing a spinning operation on the wafer at the spin station, said spin station comprising, a jaw mounting plate, a spindle connected to rotate the jaw mounting plate, jaw means operatively associated with the jaw mounting plate for gripping the wafer on its outside edge to hold the wafer in place between the jaw means during a spinning operation, said jaw means including at least one movable jaw chuck which is movable between an open position and a clamping position and which is adjustable in position at the clamping position to accommodate gripping by the jaw means of wafers whose centers are offset from the spindle axis of rotation as a result of wafer tolerance diameter variations and/or differences in the number of wafer flats and/or variations of orientations of wafer flats with respect to the locations of the jaw means, balancing means operatively associated with the movable jaw chuck and effective to maintain the gripping force exerted on the wafer by the movable jaw chuck substantially unaffected by the centrifugal forces developed by the movable jaw chuck at all speeds of rotation produced during the spinning operation and within the range of clamping positions of the movable jaw chuck, and wherein the balancing means include a balance mechanism connected to the movable jaw chuck and mounted for pivoting movement about a pivot axis spaced from the spindle axis of rotation, and means mounting the balance mechanism for rotation about said spindle axis of rotation, and wherein the balance mechanism is incorporated in a body of rotation formed about the pivot axis and includes balance weights distributed within the body of rotation so as to produce no net rotative forces about the pivot axis regardless of angular orientation of the balance mechanism about the pivot axis, and wherein the balance mechanism has a star configuration as viewed in side elevation from a distant point on the pivot axis and the movable jaw acts on the balance mechanism at a point on one tip of the star when subjected to a centrifugal force resulting from the rotation of the spindle.

8. A wafer processing spin station of the kind in which a wafer, which may have a number of flats, is gripped between jaws and is rotated to relatively high speeds of rotation about a spindle axis of rotation in the course of performing a spinning operation on the wafer at the spin station, said spin station comprising, a jaw mounting plate, a spindle connected to rotate the jaw mounting plate, jaw means operatively associated with the jaw mounting plate for gripping the wafer on its outside edge to hold the wafer in place between the jaw means during a spinning operation, said jaw means including at least one movable jaw chuck which is movable between an open position and a clamping position and which is adjustable in position at the clamping position to accommodate gripping by the jaw means of wafers whose centers are offset from the spindle axis of rotation as a result of wafer tolerance diameter variations and/or differences in the number of wafer flats and/or variations of orientations of wafer flats with respect to the locations of the jaw means, balancing means operatively associated with the movable jaw chuck and effective to maintain the gripping force exerted on the wafer by the movable jaw chuck substantially unaffected by the centrifugal forces developed by the movable jaw chuck at all speeds of rotation produced during the spinning operation and within the range of clamping position of the movable jaw chuck, and wherein the balancing means include a balance mechanism connected to the movable jaw chuck and mounted for pivoting movement about a pivot axis spaced from the spindle axis of rotation, and means mounting the balance mechanism for rotation about said spindle axis of rotation, and wherein the balance mechanism is incorporated in a body of rotation formed about the pivot axis and includes balance weights distributed within the body of rotation so as to produce no net rotative forces about the pivot axis regardless of angular orientation of the balance mechanism about the pivot axis, and wherein the balance mechanism has a pin type connection to the movable jaw chuck with the center of the pin type connection located on a line extending parallel to the axis of rotation of the spindle and passing through the center of gravity of the movable jaw chuck, and wherein the balance mechanism has a first balance weight having a weight equal to the weight of the movable jaw chuck and having a center of gravity located on a line which passes through both said pin type connection and said pivot axis and wherein the center of gravity of the first balance weight is located at a point which is laterally offset from the pivot axis by the same distance as the distance of the pin type connection from the pivot axis, and wherein the balance mechanism includes second and third balance weights each equals to the weight of the movable jaw chuck and each having a center of gravity located on a line passing through the pivot axis orthogonally to said line passing through both said pin type connection and said pivot axis and wherein the center of gravity of each of the second and third balance weights is laterally offset from the pivot axis by the same distance as the distance of the center of said pin type connection.

9. A method of maintaining a controlled, substantially constant gripping force on a wafer at a wafer processing station of the kind in which a wafer, which may have a number of flats, is gripped between jaw chucks and is rotated to relatively high speeds of rotation in the course of performing a spinning operation on the wafer at the spin station and wherein the spin station includes a jaw mounting plate and a spindle connected for rotating the jaw mounting plate during the spinning operation, said method comprising, mounting jaw chucks on the jaw mounting plate at positions effective to grip the wafer on its outside edge to hold the wafer in place between the jaw chucks during a spinning operation, mounting at least one of the jaw chucks in a movable mount which permits the movable jaw chuck to be movable between an open position and a clamping position and which permits the movable jaw chuck to be adjustable in position at the clamping position to accommodate gripping by the jaw chucks of wafers whose centers are offset from the spindle axis of rotation as a result of wafer tolerance diameter variations and/or differences in the number of wafer flats and/or variations of orientations of wafer flats with respect to the locations of the jaw chucks, and connecting a balancing mechanism to the movable jaw chuck in a way which is effective to maintain the gripping force exerted on the wafer by the movable jaw chuck substantially unaffected by the centrifugal forces developed by the movable jaw chuck at all speeds of rotation produced during the spinning operation and within the working range of clamping positions of the movable jaw chuck.

10. A balancing device for a movable component of a machine which component is subjected to angular movement about the axis of rotation of a spindle of the machine when the machine is operating and thereby subjected to centrifugal force away from such axis of rotation, and which is shiftable to different positions with different distances from such axis of rotation for different operations of the machine, comprising:

a balance mechanism connected to said component and mounted for pivoting movement, with shifting of position of said component, about a pivot axis spaced from said axis of rotation of the spindle, and including means mounting the balance mechanism for rotation about said axis of rotation of the spindle, and, wherein the balance mechanism comprises a body of rotation formed about the pivot axis and includes balance weights distributed within the body of rotation so as to produce, among the weights and said components connected to the balance mechanism, no net relative forces about the pivot axis, as a result of centrifugal forces acting on the weights and said component due to rotation about the axis of rotation of the spindle, regardless of different rotational positions of the balance mechanism about the pivot axis for different radial positions of said component during different operations of the machine.

11. A balancing device according to claim 10, wherein the machine is a wafer processing station and the component is a movable jaw chuck for exerting a gripping force on a wafer being processed at the wafer processing station.

* * * * *